Jan. 14, 1930.　　　　　D. LARKIN　　　　　1,743,554
RECOVERING THE VAPORS OF VARNISHES AND THE LIKE
Filed March 13, 1925　　　4 Sheets-Sheet 1

Inventor:
David Larkin,
By Hugh K. Wagner,
Attorney

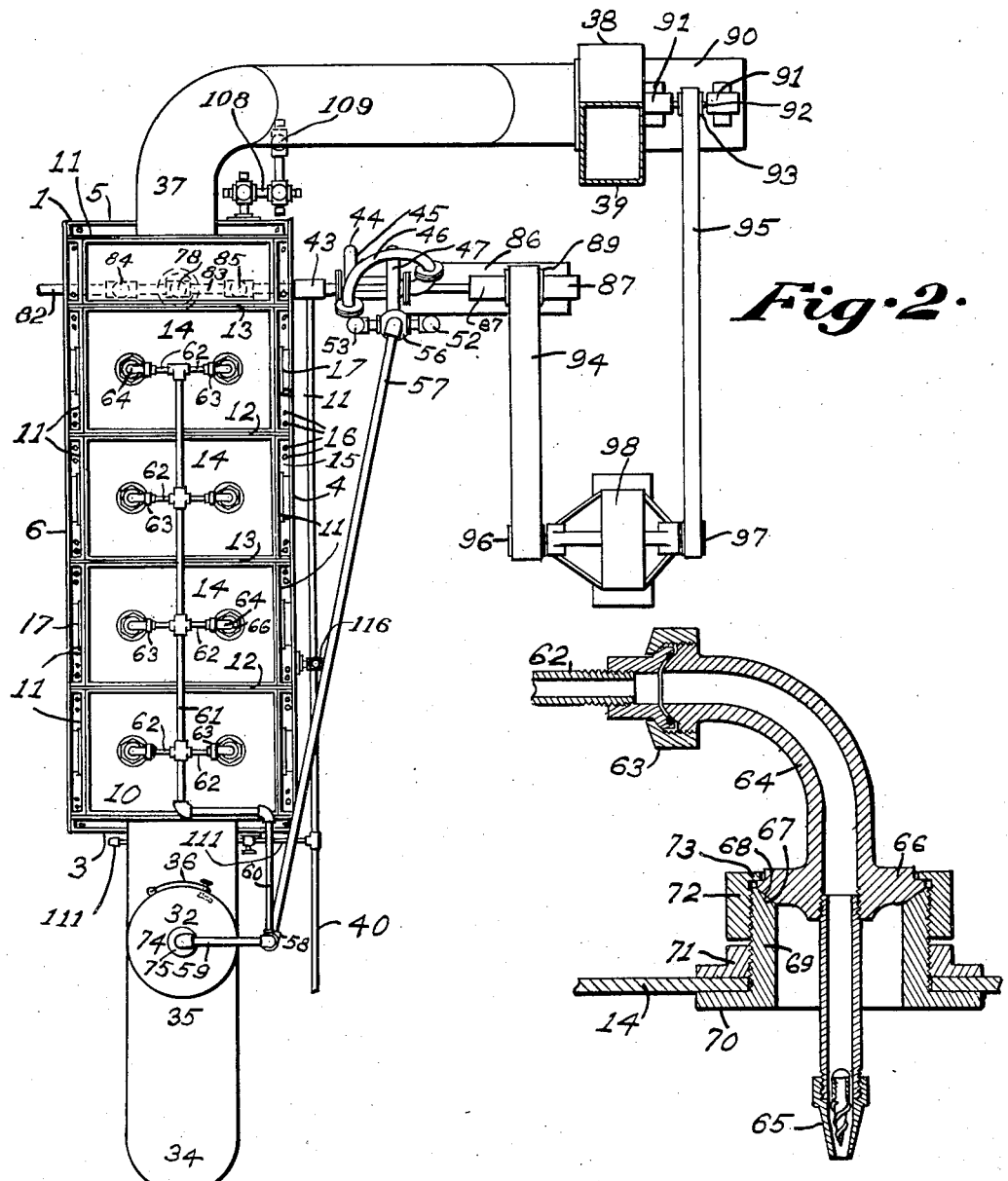
Fig·2·
Fig·3·
Inventor:
David Larkin,
By Hugh K. Wagner,
Attorney.

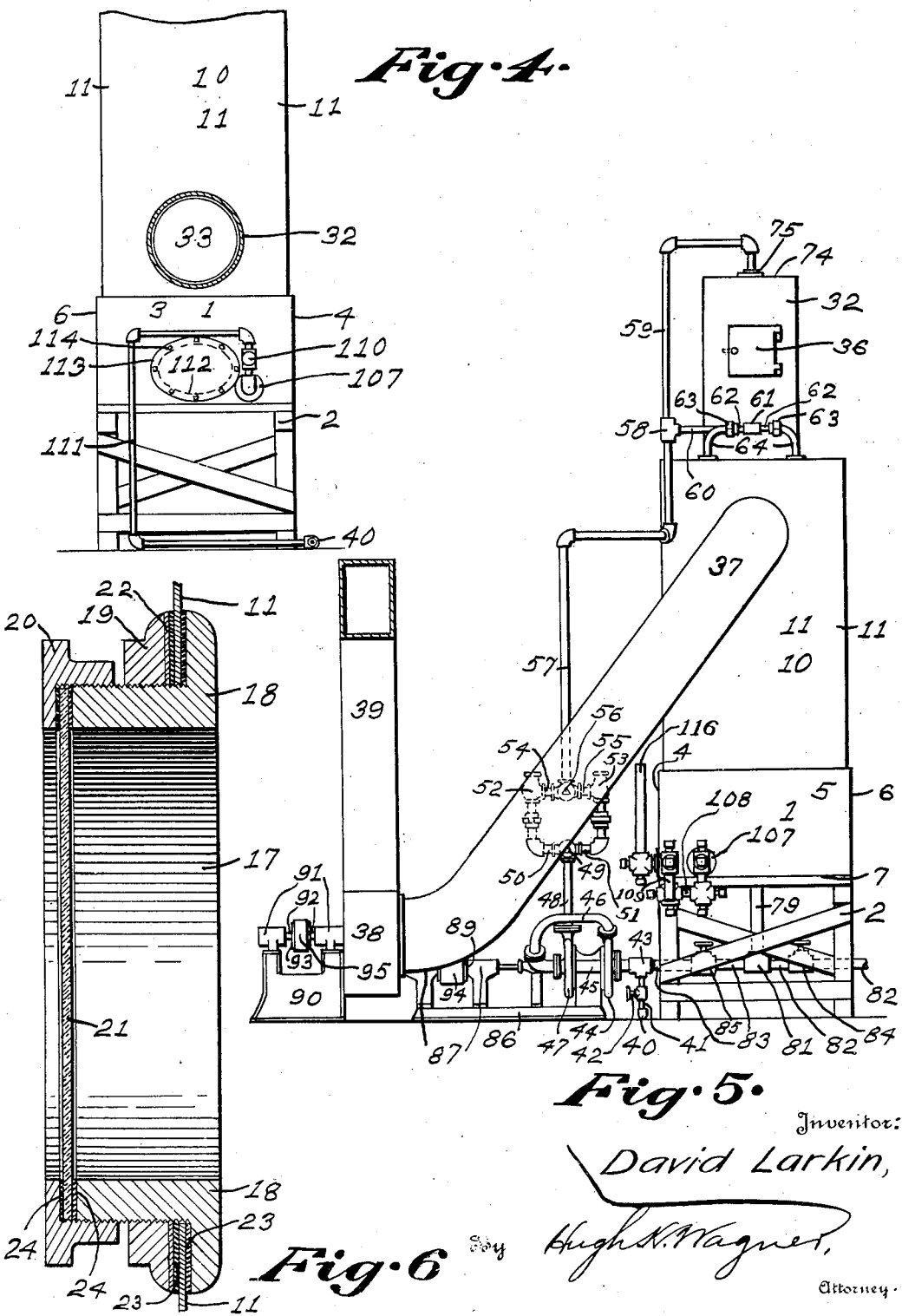

Jan. 14, 1930.        D. LARKIN        1,743,554
RECOVERING THE VAPORS OF VARNISHES AND THE LIKE
Filed March 13, 1925        4 Sheets-Sheet 4
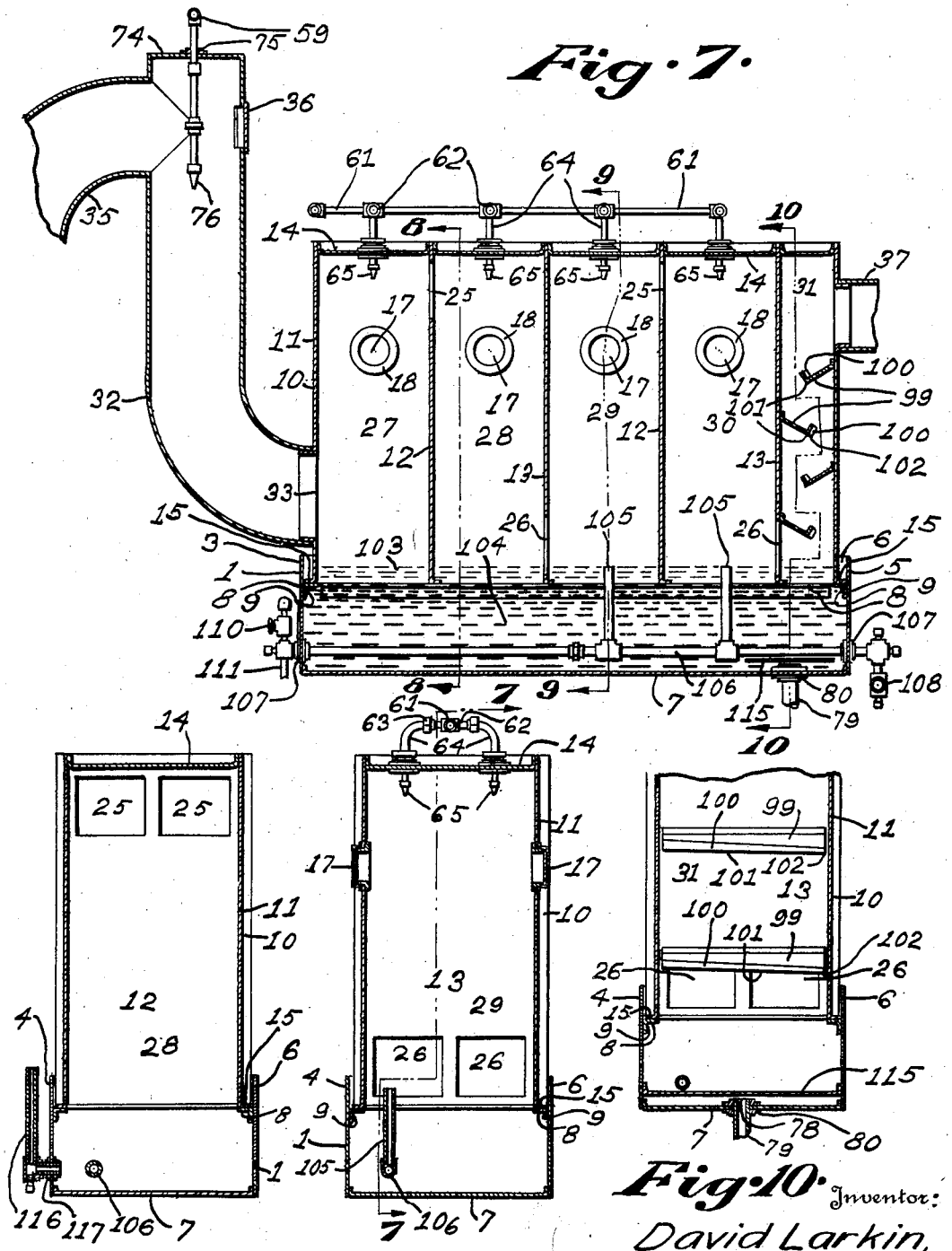
Inventor:
David Larkin,
By Hugh K. Wagner,
Attorney.

Patented Jan. 14, 1930

1,743,554

UNITED STATES PATENT OFFICE

DAVID LARKIN, OF ST. LOUIS, MISSOURI

RECOVERING THE VAPORS OF VARNISHES AND THE LIKE

Application filed March 13, 1925. Serial No. 15,376.

This invention relates to a process of and apparatus for recovering the volatile constituents of varnishes and the like which have diffused into the atmosphere. In the manufacture of varnishes and similar products, a considerable portion of the valuable oils and other ingredients evaporate constantly and eventually emanate into the outside atmosphere, creating odors that are obnoxious to the surrounding community, as well as to those employed in the industry. This invention, therefore, not only eliminates what has hitherto been considered a nuisance commonly associated with the varnish industry; but it is also of great economic importance for the reason that the high cost of the materials recovered is an important desideratum in the manufacture of varnishes.

Briefly described, the process consists in subjecting the vapor-charged air to a precipitating agent or fluid whose specific gravity differs from that of the volatile constituents of the varnish, or which is not miscible therewith, and then separating the precipitant and the precipitate in a manner which depends for its functioning on the fact that the precipitant and precipitate do not mix or have different specific gravities. The apparatus for carrying out the process comprises, briefly, a precipitating means employing a liquid precipitant, means for producing a flow of the vapor-laden air in intimate contact with the precipitant, and means for separating the condensed vapor from the precipitating fluid. The precipitating means preferably includes spraying means to condense as much of the vapor as is possible thereby, and additional means that is adapted to extract substantially the residuum of vapor remaining in the air after the major portion of the vapor has been condensed by the spraying means. Automatic means are also provided for returning the spent spraying liquid to the spraying means. The invention also resides in certain desirable features and details of construction which will be hereinafter pointed out.

In the accompanying drawings forming part of this specification, in which like numbers of reference denote like parts wherever they occur, Figure 1 is an elevational view of the complete apparatus of this invention;

Figure 2 is a plan view of the same;

Figure 3 is a detail sectional view through one of the spray nozzle holders;

Figure 4 is a fragmentary view of the entrance end of the apparatus;

Figure 5 is a view of the exit end of the apparatus;

Figure 6 is a detail transverse sectional view through one of the sight openings in the casing;

Figure 7 is a longitudinal vertical sectional view through the apparatus; and

Figure 1:
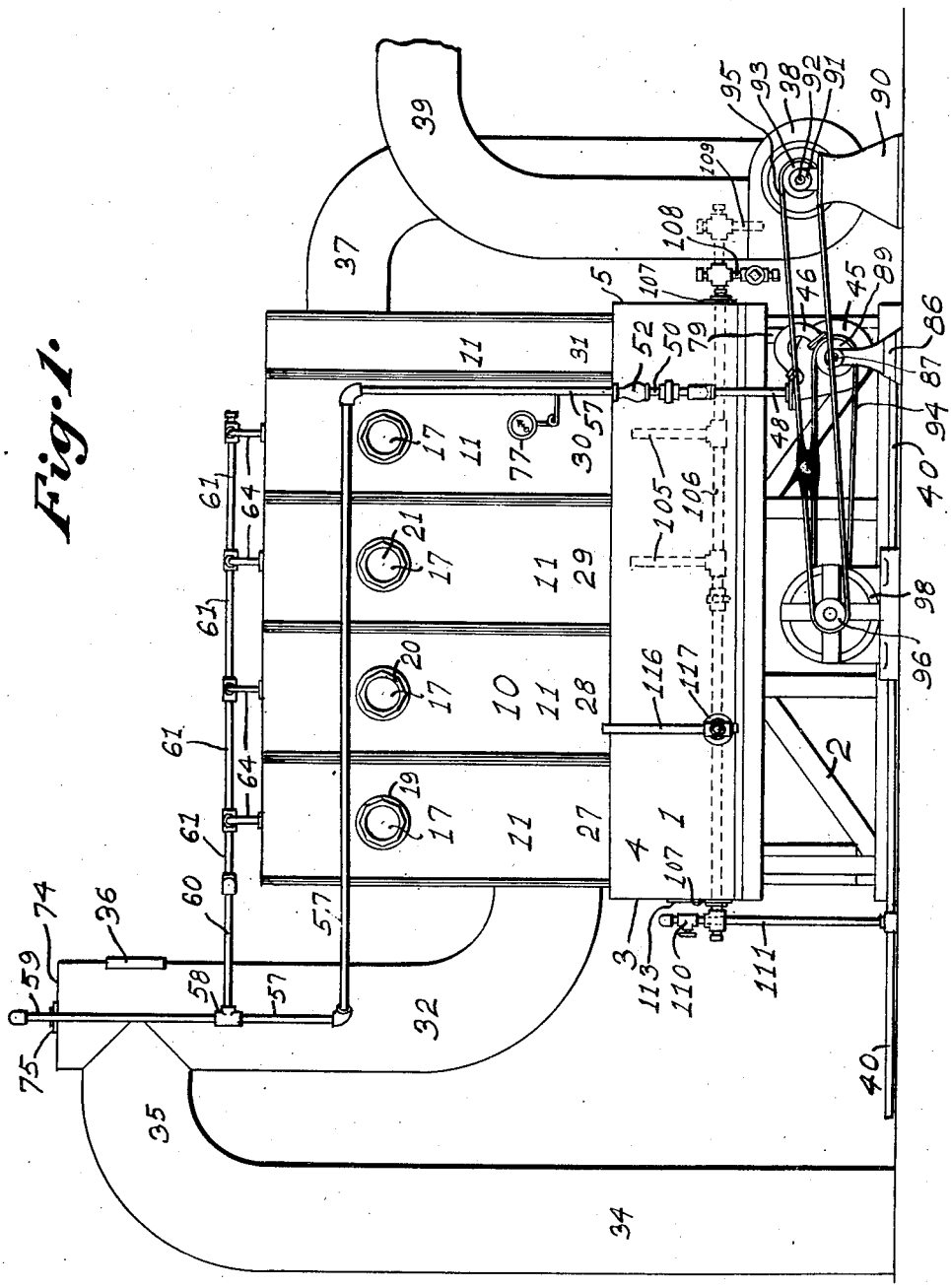

Figures 8, 9, and 10 are vertical transverse sectional views taken on the lines 8—8, 9—9, and 10—10 respectively in Figure 7, Figure 10 being partly broken away.

Referring now in detail to the preferred embodiment of this invention illustrated in the said drawings, the tank 1 is preferably elevated at a suitable height by mounting the same on a suitable frame base structure 2. The tank 1 is substantially rectangular in form, and comprises four sides 3, 4, 5, and 6 and a bottom 7, the top being open. A horizontal flange 8 is disposed preferably around the interior of the tank a short distance from the top, the said flange preferably being a part of an angle iron 9, riveted or secured in any common manner to the sides 3, 4, 5, and 6. A casing 10, built up of outer wall sections 11, partitions 12 and 13, and top sections 14 riveted or secured together in any suitble fluid tight manner, fits within the tank 1, so that the lower edges of the outer wall sections 11 and partitions 12 and 13 lie below the normal level of the liquid to be placed in the tank 1. Flanges 15, formed on the lower end of the outer wall sections 11, are adapted to rest on the flange 8, so that the casing 10 is maintained in proper vertical relation to the tank 1. The said flanges 8 and 15 may be secured together by bolts 16. Sight openings 17 in the walls 11, preferably in the form of fluid tight glass windows enable the operator to view the interior of the casing from the outside, and to observe the manner in which the apparatus is functioning on the inside. The opening 17, shown in detail in Figure 6, comprises externally threaded annular casing 18, internally threaded ring 19 for clamping the same to casing 10, internally threaded flanged ring 20 for clamping plate glass 21 to casing 18, washer 22, and packing rings 23 and 24. Each of the partitions 12 have openings 25 in the upper portions thereof; and each of the partitions 13 have similar openings 26 in the lower portions thereof, the level of the liquid in the tank 1 preferably intersecting the openings 26. The partitions 12 are disposed alternately with the partitions 13, dividing the casing 10 into a row of alternate uptake and downtake compartments or chambers 27, 28, 29, 30 and 31, best shown in Figures 7 to 10 inclusive.

A downtake pipe 32 is juxtaposed to the entrance end of the apparatus, and leads through an opening 33 in the lower portion of the front end wall of the casing 10 into the chamber 27. Means are provided to lead vapor-charged air from those portions of the plant where the evaporation of the volatile constituents of the varnish occurs, and in the present instance such means consists of a pipe 34 leading from a varnish room on the floor below into the upper end of the pipe 32, preferably transversely into the side thereof through a bend 35. In the pipe 32 disposed oppositely to the bend 35, is a door 36, which provides access to the interior of the pipe and to spraying means therein to be hereinafter described. A pipe 37 leads from the upper portion of chamber 31 through the exit end or rear wall of the casing 10 down to a blower 38, and from the blower 38 a pipe 39 leads to the exterior of the building.

The spraying means in the downtake air pipe 32 and in the casing 10 are supplied with suitable spraying liquid, preferably water, through a suitable system of piping and of any suitable pumping means. Water is supplied to the system of piping from any suitable source through the pipe 40, arranged along the floor adjacent one side of the supporting structure 2, and rising at 41 through a valve 42 to T-fitting 43, included in the circulating system now to be described. One end of T-fitting 43 leads to the first stage unit 44 of a two-stage centrifugal pump 45, and a pipe 46 leads from the first stage unit 44 to the second stage unit 47, from whence pipe 48 rises to three-way valve 49, from which alternatively used branches 50 and 51 respectively lead to respective pressure regulators 52 and 53, which in turn lead through nipples 54 and 55 to three-way valve 56. Delivery pipe 57 leads from valve 56 to T-fitting 58, from which lead branch pipes 59 and 60. Branch pipe 60 leads to header 61, disposed above the casing 10, and supplying branches 62, each of which leads through a union 63 and elbow 64 to a spray nozzle 65, as shown in detail in Figure 3. The lower end of elbow 64 enlarges laterally into a transverse annular flange 66, having a seat 67, adapted to co-operate with a seat 68 on the upper end of an externally threaded sleeve 69, the lower end of which spreads into a flange 70, adapted to be clamped against the under side of the top walls 14 of the casing 10 by means of a clamping ring 71, threading on the sleeve 69 against the upper side of the top walls 14. Elbow 64 is clamped to sleeve 69 by means of clamping ring 72, screwed on the sleeve 69 so that flange 73 of the ring 72 bears against the upper side of flange 66. By means of this construction for holding the spray nozzles, the latter may be readily removed for the purpose of inspection, repairs, replacement, or cleansing by merely unscrewing ring 72 and union 63, and without disturbing or disconnecting the remainder of the piping. This means for holding the spray nozzle forms the subject-matter of another application for patent by the same inventor. In the present instance two spray nozzles have been provided for each of the chambers 27, 28, 29, and 30, but any suitable number may be employed therein according to requirements. Branch pipe 59 leads to a point over the upper end wall 74 of downtake air-pipe 32, and then descends through wall 74 into pipe 32 to a point preferably slightly lower than the bottom of the opening leading into the elbow 35. Pipe 32 passes through and is securely held by a tightly fitting flange 75 secured to the wall 74. A spray nozzle 76 is secured to the terminus of pipe 59 in the pipe 32. The spray nozzle 76 is preferably much larger than the nozzles 65, and also functions as an injector to assist the downward flow of air in the pipe 32. A pressure indicator 77 may be secured to the delivery pipe 57 preferably at a point a short distance above the three-way valve 56. A discharge opening 78 is formed in the bottom 7 of the tank 1, preferably at a point under the chamber 31. A pipe 79 is connected to the said opening 78 by means of a flange 80, and descends to a T-fitting 81, from which branch pipes 82 and 83 lead to the waste receiver and T-fitting 43 respectively. Pipes 82 and 83 contain respective gate valves 84 and 85, by means of which the water discharged from the tank 1 may be diverted either to the pump 45 or the waste pipe 82.

Centrifugal pump 45 is mounted on its base 86, which also bears standards 87, in which is journaled the pump operating shaft 88, driven by means of pulley 89, affixed thereto. Frame 90 of blower 38 includes bearings 91, in which is journaled blower operating shaft 92, driven by pulley 93, affixed thereto. Pulleys 89 and 93 are driven by belts 94 and 95, respectively, which are in turn driven by respective pulleys 96 and 97 disposed at opposite ends of the driving motor 98.

Chamber 31 is provided for the purpose of removing as much as possible of the residue of vapor remaining in the air after the latter has passed through the spraying chambers 27, 28, 29, and 30. The means for removing the residuum of vapor comprises a plurality of baffle plates 99, arranged in staggered relation on opposite sides of the chamber 31, so as to provide a tortuous path for the air ascending therethrough. The said baffles are secured respectively to partition wall 13 and end wall 11 by means of rivets, or in any other common manner, so as to slope downwardly from the walls. Flanges 100 extend upwardly from the lower edges 101 of the said baffles to prevent condensed vapor which has collected on the baffles from draining directly off the edges 101. One end 102 of each of the edges 101 is lower than the other, so that all the condensed vapor collected on the baffles 99 must drain off at a single point, that is, at the lower end 102 of the edge 101. By thus draining off at a single concentrated point, the condensed vapor is not so apt to be re-atomized as it might be were it allowed to drain off along an extended edge or at a plurality of points. Furthermore, arranging the lower end 102 adjacent the side wall of the chamber causes the condensation to flow down along the wall in a continuous stream instead of breaking up into drops, thus further preventing reatomization.

The varnish vapor condensed in the chambers 27, 28, 29, 30, and 31, together with the spent spraying water from the several nozzles, settles into the tank 1 in layers of two different liquids, which do not mix and have different specific gravities, the lighter layer 103 of condensed varnish vapor floating on top of the heavier layer 104 of water. The upper layer drains off into overflow pipes 105, rising vertically from the overflow header 106, which extends entirely through the tank 1 from end to end, and is secured in position in the tank 1 by means of fluid tight flanges 107 secured to the end walls 3 and 5 respectively. The overflow risers 105 extend high enough to maintain the level of liquid in the tank at a sufficient height to seal the open bottom of the casing 10 and yet not cause any flow over the edges of the tank 1. That portion of the pipe 106 emerging from the end wall 5 leads through a trap 108 to a depending terminus 109, from whence it discharges into any suitable receptacle that may be placed thereunder. Overflow risers 105, header 106, trap 108, and discharge stem 109 may need cleansing at intervals, and for this purpose valve 110, interposed between the other end of header 106 and the riser 111 branching off from water main 40, may be opened to admit water from the main 40 to flush the said header and associated parts. Access to the interior of the tank 1 is afforded by a manhole 112, in the end 3, and normally closed by a cover 113, secured thereto by screws 114. A baffle plate 115 is secured in any suitable manner to the sides 4 and 6 of the tank 1 directly over the discharge opening 78. The said baffle 115 prevents the formation of a whirlpool over the discharge opening 78, which whirlpool would draw into the opening 78 the upper layer of varnish constituents as well as the lower layer of water, thus frustrating the purpose of the apparatus. It will be noted that both opening 78 and overflow pipe 105 are juxtaposed to the end wall 5 of the tank 1, so that both upper and lower layers flow in the same direction through the tank 1 and also with the stream of air as it progresses through chambers 27, 28, 29, 30, and 31. A riser 116, leading from the tank 1 through a flange 117 on the side 4, enables the operator to observe the level of liquid in the tank through its open upper end. Or the riser may be formed of glass tubing to facilitate the observation.

The mode of operation of this apparatus will now be briefly described. The motor 98 is started, operating the blower 38 and pump 45, and thus producing a circulation of water towards the spray nozzles 65 and 76, and drawing in vapor-charged air through pipe 34 into downtake pipe 32, wherein it descends and passes through opening 33 into chamber 27, ascending therein and emerging therefrom through openings 25 in partition 12 into downtake chamber 28. The air then descends in chamber 28, passes through openings 26 in partition 13 into chamber 29. In like manner, the air ascends in chamber 29, descends in chamber 30, and ascends again in chamber 31, from whence it issues into exit pipe 37 to the blower 38, and from the latter through pipe 39 into the outside atmosphere. The spray issuing from the several nozzles condenses the volatilized constituents of the varnish that are diffused in the air thus drawn through the casing 10, and the residue of vapor remaining when the air reaches the chamber 31 is as thoroughly extracted as possible by the condensing and collecting properties of the baffles 99. The vapor condensed in pipe 32 and chambers 27, 28, 29, 30, and 31, together with the spent water from the several spray nozzles, settles into the tank 1, the precipitate of varnish constituents floating on a sublayer of water. The overflow pipes 105 and discharge opening 78 form selective means for diverting the precipitate and precipitant into separate channels, the varnish ingredients being delivered to discharge spout 109, and the water being returned to the pump 45.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. Apparatus for recovering the volatile varnish constituents from varnish-laden atmosphere comprising a casing, spaced vertical partition walls located within the casing, the alternating partition walls having openings at the lower ends and the intervening partition wall having an opening at its upper end, vertically disposed overflow pipes passing through the bottom wall of the casing and located between the partition walls and vertically disposed spray nozzles passing through the top wall of the casing and having their discharge ends in spaced parallel relation with the intake ends of the overflow pipes, the nozzles and the overflow pipes lying in the same vertical plane and located midway between the partitions, the arrangement being such that a volume of varnish-laden atmosphere when passed through the casing is folded into parallel columns by the vertical partition walls, said columns having currents moving diagonally through the spaces between the nozzles and the overflow pipes, and simultaneously precipitating jets are injected medially into the columns and directed downwardly toward the intake ends of the overflow pipes in lines at angles to the movement of said currents.

2. Apparatus for recovering the volatile varnish constituents from varnish-laden atmosphere comprising a casing, spaced vertical partition walls located within the casing, the alternating partition walls having openings at the lower ends and the intervening partition wall having an opening at its upper end, vertically disposed overflow pipes passing through the bottom wall of the casing and located between the partition walls, and having their receiving end edges located in a plane lying below the plane in which the upper edges of the lower openings lie and above the plane of the lower edges of said openings, and vertically disposed spray nozzles passing through the top wall of the casing and having their discharge ends in spaced parallel relation with the intake ends of the overflow pipes, the nozzles and the overflow pipes lying in the same vertical plane and located midway between the partitions, the arrangement being such that a volume of varnish-laden atmosphere when passed through the casing is folded into parallel columns by the vertical partition walls, said columns having currents moving diagonally through the spaces between the nozzles and the overflow pipes, and simultaneously precipitating jets are injected medially into the columns and directed downwardly toward the intake ends of the overflow pipes in lines at angles to the movement of said currents.

In testimony whereof I hereunto affix my signature.

DAVID LARKIN.